United States Patent
Mason et al.

(10) Patent No.: US 12,486,913 B2
(45) Date of Patent: Dec. 2, 2025

(54) THERMAL BYPASS CONTROL VALVE FOR A COOLER LINE BLOCK WITH OFFSET CHANNELS FOR AN OUTFLOW LINE

(71) Applicant: SUPERIOR TRANSMISSION PARTS, INC., Tallahassee, FL (US)

(72) Inventors: Dean Mason, Tallahssee, FL (US); Robert T. White, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 244 days.

(21) Appl. No.: 18/560,578

(22) PCT Filed: May 16, 2022

(86) PCT No.: PCT/US2022/029480
§ 371 (c)(1),
(2) Date: Nov. 13, 2023

(87) PCT Pub. No.: WO2022/241324
PCT Pub. Date: Nov. 17, 2022

(65) Prior Publication Data
US 2024/0255063 A1    Aug. 1, 2024

Related U.S. Application Data

(60) Provisional application No. 63/188,531, filed on May 14, 2021.

(51) Int. Cl.
  *F16K 11/087*  (2006.01)
  *F16H 57/04*  (2010.01)
(52) U.S. Cl.
  CPC ........ *F16K 11/087* (2013.01); *F16H 57/0413* (2013.01)
(58) Field of Classification Search
  CPC ............... F16K 11/087; F16K 17/0406; F16H 57/0413; F16H 57/0435; F01P 2060/045; F01P 7/16
  See application file for complete search history.

(56) References Cited

U.S. PATENT DOCUMENTS 11,131,379 B2 *   9/2021  Qiu ........................ G05D 23/02
2023/0349460 A1 * 11/2023  Mason ................ F16H 57/0435

* cited by examiner

*Primary Examiner* — Marc E Norman

(57) ABSTRACT

A thermal control valve includes a plug, a valve seat apparatus, and a valve member positionable within a cooler line block with offset channels for an outflow line between a transmission and a transmission fluid cooler. The plug and valve seat apparatus are kept at a fixed positioned relative to each other by a first spring. A second spring is positionable within a connecting passage between the outflow line and an inflow line. The valve member is positioned between the second spring and the valve seat apparatus to move between a closed configuration to cool fluid, and a cooler bypass position to bypass the transmission fluid cooler when outflow line pressure becomes too high.

19 Claims, 9 Drawing Sheets

THERMAL BYPASS CONTROL VALVE FOR A COOLER LINE BLOCK WITH OFFSET CHANNELS FOR AN OUTFLOW LINE

CROSS-REFERENCE TO RELATED APPLICATIONS

The present invention claims priority to U.S. provisional patent application No. 63/188,531, filed on May 14, 2021, the entirety of which is incorporated by reference.

STATEMENT REGARDING FEDERALLY SPONSORED RESEARCH

Not applicable.

Parties to a Joint Research Agreement

Not applicable.

Sequence Listing

Not applicable.

Statement Regarding Prior Disclosure

Not applicable.

BACKGROUND OF THE INVENTION

Field of the Invention

The present invention relates to a method for improving OEM (original equipment manufacturer) systems for supplying cooled fluid lubricant through an automotive transmission, and to replacement parts for effecting said improvements, namely, improved thermal control system valves replacing OEM valves in automotive transmissions in order to improve performance and reduce maintenance costs.

Brief Discussion of the Prior Art

Most heat in an automatic automobile transmission is generated in the torque converter (TC). Heat generation is relatively low during a lockup, or fluid coupling, phase, but during torque multiplication, and especially at maximum stall, high vortex flow forces fluid to make hard turns which generates a high level of fluid friction against internal component surfaces (for example, impeller, stator, and turbine). During sustained hard working conditions in the transmission, fluid temperatures can flash up to 300-400 degrees Fahrenheit (° F), or 148.89-204.44 degrees Celsius (° C.). Thus, the most logical destination for liquid coolant, or fluid, flow is away from the torque converter through a converter OUT line, which is a line directly away from the torque converter to a transmission fluid cooler. Since the fluid returning from the fluid cooler is generally the coolest in the transmission, it is then ideal for that cooled fluid to flow through lubrication circuits (LUBE), where it lubricates and cools intermeshing gears, washers, bearings, and bushings under load. From there, the fluid drains into the sump where it is drawn through the sump filter by the pump, which supplies that line pressure from which converter feed is derived. Thus, the basic cycle for this portion of transmission function is: SUMP—FILTER—PUMPSUCTION—PUMP OUTPUT—LINESUPPLY—TC FEED—TC OUT—COOLER—LUBE—back to SUMP. This strategy is typical, and has been employed universally in all automatic transmissions for nearly a century with only a few rare exceptions.

In the same way a catalytic converter offers back pressure (i.e., resistance to flow) in an exhaust system, the transmission fluid cooler offers resistance in the fluid cooling system of the transmission, resulting in a pressure differential between the converter OUT line to the cooler (also referred to as an outflow line) as compared to a cooler return line to lubricate the transmission (also referred to as an inflow line). Two examples will suffice to illustrate this pressure differential. First, Honda 4 and 5 speed transmissions will typically flow 1.5 gallons per minute (GPM), or 9.46353e-5 cubic meters per second ($m^3$/s) at 20-30 pressure per square inch (PSI), or 137.90-275.79 Kilopascal (kPa), on the outflow line, with about 6 PSI (41.37 kPa) in the inflow line. A Ford 5R110W transmission will flow 2-4 GPM (0.00012618-0.000252361 $m^3$/s) at 20-40 PSI (137.90-275.79 kPa) through the outflow line, with 10-15 PSI (68.95-103.42 kPa) on the cooler inflow line. In this manner it is typical for most transmission cooler systems to maintain a 15-25 PSI (103.42-172.37 kPa) differential between outflow lines and inflow lines on either side of the cooler.

With an increased use of internal transmission computers, solenoids, sensors, pressure switches, and so forth, in modern automobiles, in combination with adaptive-learn and advanced shift control strategy programming, car manufactures have concluded that it is advantageous to warm the transmission fluid to an optimum operating temperature as quickly as possible, and thereafter maintain that controlled temperature throughout the drive cycle of the vehicle. The assumption is that if fluid temperature and viscosity are held constant, transmission functions can be controlled more consistently.

It has become quite fashionable in automotive engineering to employ the use of a thermostatic switch device to regulate flow through the transmission cooler. This "thermal element", as it is most commonly called, is placed somewhere in the thermal control system of the transmission where it can connect the outflow line and the inflow line circuits. In some cases it is utilized in coordination with a flow control valve. Sometimes the thermal element itself is designed as a compound part, and functions as a thermally expanding valve. Other times, the thermal element itself is the flow stop device without the aid of a valve. In all cases, whether secondary devices are employed or not, the fundamental principles do not change. Fluid temperature is thermostatically controlled in similar fashions.

The actual physical location of the thermostatic switch device, or thermal element, in principal can be anywhere these two circuits can be physically bridged. Further, the cooler, the outflow line, the inflow line, and thermostatic switch device together are often referred to as a thermal bypass system. To date, manufacturers have used five different locations for the thermal element:

TABLE 1

| LOCATION | EXAMPLE TRANSMISSION |
| --- | --- |
| 1. In Transmission Pump | Ford 5R110W |
| 2. In Transmission Valve Body | Ford 4/5R55E, 5R55W, 5R55N, 5R55S |
| 3. In Transmission Case Under Valve Body | Ford 6R80 |
| 4. In The Cooler | Dodge 68RFE, 545RFE |
| 5. In The Cooler Lines | GM 6L80 & 6L90; Allison 1000; Ford 4R75W, 6F35; Chrysler 42RLE, |

TABLE 1-continued

| LOCATION | EXAMPLE TRANSMISSION |
|---|---|
| | 45RFE, 545RFE, 68RFE; Jatco/Nissan JF011E (RE0F10A); Mercedes 722.6 |

Regardless of location, the purpose of the thermal element is identical, and in many cases the same exact physical part is used, and by different manufactures. For example, one thermal element has been used in Ford, GM, Dodge, and Mercedes transmissions.

There is however a difference in accessibility and/or serviceability between these different locations. In the case of location #1, the transmission must be removed to access the pump. Location #2 requires valve body removal and disassembly. Location #3 requires valve body removal. Locations #4 and #5 are more easily and more cost effectively serviced, since they are external to the transmission. Thus, as more vehicles begin to use thermal flow control, location #5 is quickly becoming the preferred site for thermal element placement.

The structural shape of the thermal element also necessarily varies between most locations, most notability between a thermal element in the pump (location #1), an element in the valve body (location #2), an element in the case (location #3), and an element in the cooler or cooler lines (locations #4 and #5). Between the different possible locations, only valves used in locations #4 and #5 are likely to have an identical or highly similar structure, as the thermal element in the cooler lines (#5) can be integrally formed with the cooler (#4). Otherwise, a valve in the pump, for example, is not interchangeable with a valve meant to be used in a thermal element located in the transmission case.

There are a variety of different housings used to contain the thermal element of the same location between transmission manufacturers, but for the most part these are size and shape alterations necessary to accommodate differently sized cooler lines and different mounting locations. The valves used between these different housing shapes and sizes would be structured similarly, as the internal method of controlling cooler flow would be similar.

There are three possible states for known thermal bypass systems:
1. Fully OPEN when cooler is bypassed;
2. Fully CLOSED when ALL the flow is forced through the cooler; and
3. The INTERMEDIATE or PARTIAL ON state.

When the thermal element is fully open, fluid flows out of the converter, drops down and loops through the lockup control valve, and comes back up to a split. One direction goes to the flow valve. The other direction goes to the out fitting (out at the transmission and in at the cooler). Under pressure, flow always follows the path of least resistance, so the fluid flow chooses the inflow line because the resistance in the cooler is much greater than that of the lube system. Pressure is transferred in both directions from the converter out circuit, but is equalized at the cooler return fitting, thus stopping cooler flow. Thus, in the OEM system, below a certain temperature, fluid flows in two directions and is stopped within the inflow line near the connection of the cooler to the inflow line. This system substantially prevents the flow of cooled fluid from the cooler to the transmission. This is otherwise known as cooler bypass.

When the thermal element in an OEM system is fully closed, flow is restricted to one direction. This occurs when the fluid temperature is above the desired operating temperature. The thermal element is expanded sufficiently, due to silicon or a similar expanding element in the valve, to completely close the valve and prevent cooler bypass in order to force all fluid flow through the cooler to bring temperature down.

When the thermal element is cold, the valve allowing fluid flow through the thermal element is in an open, default position. When the thermal element is over the thermal temperature limit, for example, 250° F. (121.11° C.), the valve is in a closed, bypass position. But, as the fluid begins to cool, the thermal element begins to contract and holds the valve in a midway flow metering position where the valve is just cracking open in the bore. This is the normal operating state, where the element functions to sustain a predetermined automatic transmission fluid (ATF) operating temperature, which is typically around 225-235° F. (107.22-112.78° C.). The thermal element holds the valve in a flow limiting position where part of the converter out flow goes through the cooler, and part of the flow bypasses through the thermal element directly to the transmission through the IN line. In this fashion, the fluid is partially cooled, and temperature is dynamically regulated. If ambient air temperature drops, and the cooler is more efficient, it bypasses more. If air temp rises, it pushes more fluid through the cooler.

There are multiple issues with this system, however, including:
- Overheating without setting diagnostic trouble codes as expected;
- setting "phantom" codes as a result of erratic and inconsistent operation and/or temperature control;
- silicon pack (in the thermal element valve) failure, leakage, and/or rupture with loss of fluid temperature control;
- valves or other switching devices associated with the thermal element subject to sticking, which prevents proper and timely opening and closing of the thermal element;
- cooler blocked and/or restricted with thermal system in cooler flow ON mode resulting in no cooler flow or lubrication, causing the planetary system to crash; and
- when the thermal control system gets stuck in bypass mode, and cooler flow never begins, fluid can heat to nearly 400 °F. (204.44° C.; at this temperature, if supplied oxygen, the ATF becomes a fuel and will sustain a fire).

Even when the thermal control system has not malfunctioned, high fluid operating temperatures increase expansion of valve body castings resulting in reduced and/or insufficient valve clearance. This causes slowed valve response to switching signals, sluggish regulation, and valve sticking with even the slightest amount of particle or carbon powder contamination. The same behavioral characteristics are observed with solenoids, especially PWM-type solenoids. Higher temperatures make it more difficult for adaptive learn solenoids to remain stable. The solenoids tend to drift, in an effort to dial in control of functions, while being compromised by temperature induced mechanical obstructions in multiple areas.

An improved thermal bypass control valve is discussed in U.S. Pat. No. 9,249,875 to Mason. The valve of Mason is designed to operate as part of a thermal element in location #2, the valve body, which is the location of the thermal element in Ford® 5R55 series transmissions. While the valve of Mason would be applicable to other transmissions with the thermal element located in location #2, the valve of Mason would not be applicable to transmissions having thermal elements in locations #1, #3, #4, or #5. Thus, the improved thermal bypass control valve provided in Mason transmission cannot be applied to all other transmissions.

In view of the foregoing, there is a need for an improved process for supplying cooler to all automotive transmissions to avoid potential damage that may be caused to transmissions due to failure or faulty operation of thermal elements across various models of transmissions. There is a need to ensure constant flow of fluid through the cooling system. There is also a need to ensure immediate fill of the cooling system with accurate fluid levels without a warm-up cycle. Further, there is a need for thermal bypass valves that accomplish these improvements across transmissions having the thermal element located in the pump, in the case, or in the cooler or cooler lines.

The instant invention relates to a thermal bypass valve designed for a cooler block located along the inflow and outflow lines (#5 in Table 1). Specifically, the instant invention relates to a thermal bypass valve and method of replacing an OEM valve with the same in a cooler block. The cooler block may have an offset inflow line.

SUMMARY OF THE INVENTION

To resolve the issues present in OEM cooler flow valves, the instant invention provides for a preferred embodiment of a thermal bypass control valve insertable in a bore of a cooler line block with offset channels for an outflow line, the valve including:

a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having
  a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion,
  a valve seat ring insertable over the insertable portion of the valve seat portion, and
  a cylindrical spacer slidable over the neck portion of the insertable portion;

a stabilizing spring configured to be positionable between the plug and the valve seat apparatus to secure the valve seat apparatus in a fixed position within the bore;

a valve member, and a valve spring, the valve member spring securable at a base end against a bottom of the bore and against the valve member at a valve spring end, wherein the valve spring secures the valve member against a surface of cavity in a closed configuration, and the valve spring compresses to move the valve member away from the surface of the cavity in an open configuration.

Another embodiment of the thermal bypass control valve is taught, wherein the stabilizing spring further comprises a base end and a receiving end, the receiving end having a smaller diameter than the base end, and wherein the inner member is insertable within the smaller diameter of the receiving end and the based end is securable against an upper surface of the ball seat body.

Another embodiment of the thermal bypass control valve is taught, wherein the cavity of the ball seat portion includes a cylindrical cavity portion 236 and a frusto-conical cavity portion 238.

Another embodiment of the thermal bypass control valve is taught, wherein the ball contacts the frusto-conical cavity portion in the closed configuration. Another embodiment of the thermal bypass control valve is taught, wherein the plug ring and ball seat ring are elastically deformable and provide a friction coefficient to secure to the plug and ball seat portion within the bore.

Another embodiment of the thermal bypass control valve is taught, wherein the cylindrical spacer has a squared edge along a bottom inner edge and a bottom outer edge 244a, and has a curved edge along a top inner edge and a top outer edge.

Another embodiment of the thermal bypass control valve is taught, wherein the ball seat ring is positioned with the top inner edge and top outer edge oriented toward the ball seat body.

Another embodiment of the thermal bypass control valve is taught, wherein the stabilizing spring extends within the bore between the offset channels for the outflow line.

Another embodiment of the thermal bypass control valve is taught, wherein the ball seat apparatus is positioned within the bore such that it does not reduce an opening of a first offset channel of the outflow line.

Another embodiment of the thermal bypass control valve is taught, wherein the plug is positioned within the bore such that it does not reduce an opening of a second offset channel of the outflow line.

An embodiment of a method for improving fluid flow through a transmission thermal control system is taught, including:

a) removing an original equipment manufacturer (OEM) thermal bypass control valve from the bore of the cooler line block with offset channels; and b) inserting the cooler fluid control valve of claim 1 into the bore of the cooler line block.

A further embodiment of the method is taught, wherein the bore includes an upper portion and a lower portion, the lower portion having a smaller diameter than the upper portion.

A further embodiment of the method is taught, further including using a modified ball seat ring with a thicker diameter to compensate for the smaller diameter of the lower portion of the bore.

A further embodiment of the method is taught, furthering including, before step b), inserting the ball seat ring over the neck portion, inserting the spacer in the bore, inserting the ball seat portion with the ball seat ring over the neck portion into the bore, and forcing the ball seat ring around the base portion by pressing the neck portion within an inner circumference of the spacer.

Another embodiment of the thermal bypass control valve includes:

a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having
  a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion,
  a valve seat ring insertable over the insertable portion of the valve seat portion, and
  a cylindrical spacer slidable over the neck portion of the insertable portion;

a cap having a central opening and a plurality of openings, the plurality of openings arranged around the central opening;

a stabilizing spring configured to be positionable between the plug and the cap to secure the cap and the valve seat portion in a fixed position within the bore;

a valve member, and a valve spring, the valve member spring securable between the plug and the valve member, wherein the valve spring extends through the central opening of the cap and movably secures the valve member against a surface of the cavity in a closed configuration, and the valve spring compresses to move the valve member away from the surface of the cavity in an open configuration.

A better understanding of the invention and its embodiments will be had with reference to the drawings, described herein.

BRIEF DESCRIPTION OF THE SEVERAL VIEWS OF THE DRAWINGS

The invention will be better understood with reference to the following figures illustrating the embodiments of the invention.

DETAILED DESCRIPTION OF THE INVENTION

Figure 1:
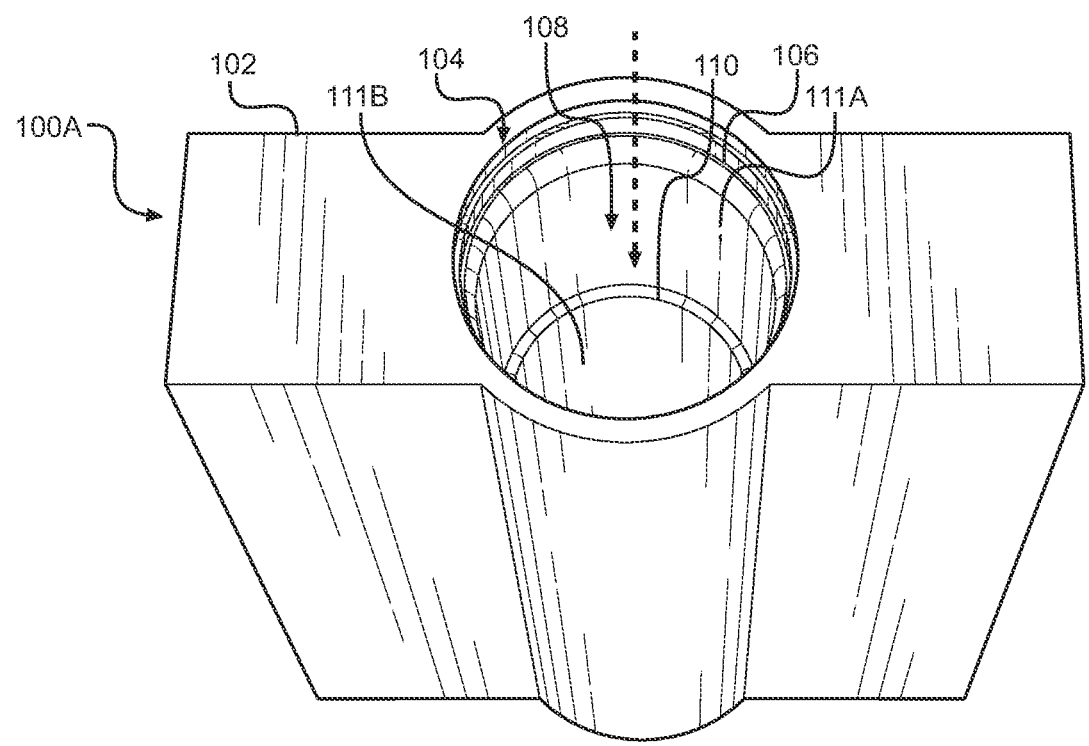
FIG. 1 is a perspective view of a cooler line block with a bore having a reduced bore diameter.
Figure 2:
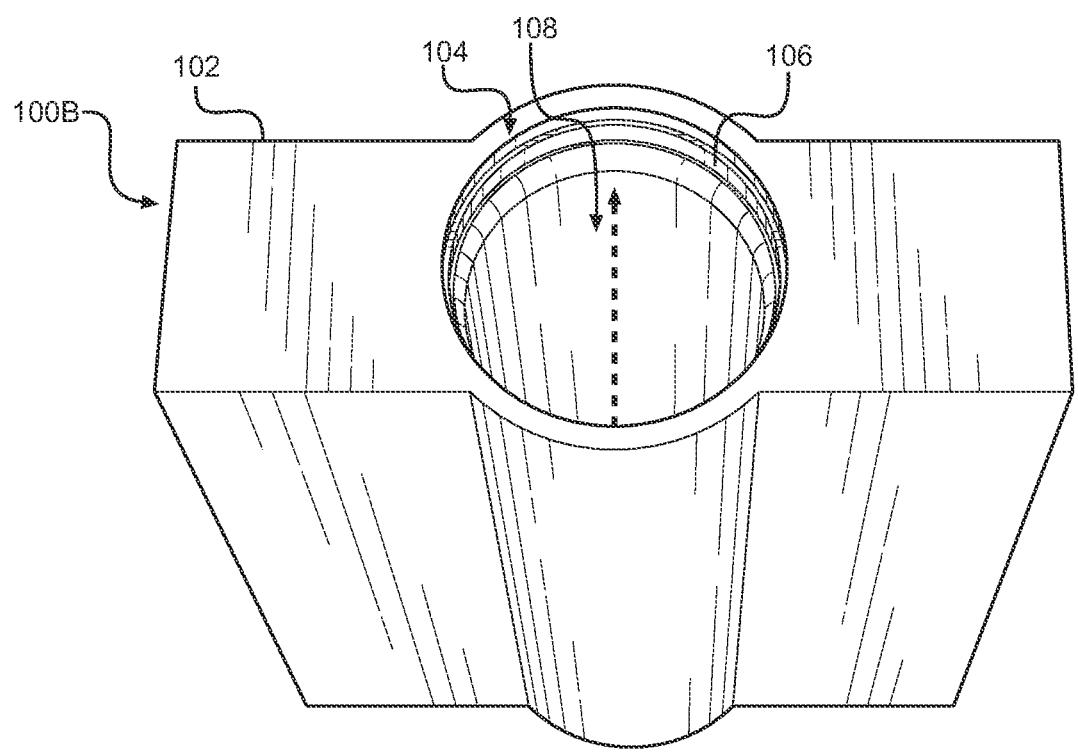
FIG. 2 is a perspective view of a cooler line block with a bore having a constant bore diameter.

FIGS. 1 and 2 illustrate two types of representative cooler line blocks 100A and 100B, respectively, found in automatic automotive transmissions. Cooler line blocks are metal housings having a body 102 that is connected on two or more sides to each of an inflow line and an outflow line. From one side of the cooler line block, the outflow line delivers fluid from the transmission to the cooler line block, and fluid flows from the cooler line block to the cooler through the outflow line on another side of the cooler line block. An inflow line between the cooler line block and the cooler transports fluid from the cooler to the cooler line block, and the inflow line between the transmission and cooler line block transports fluid from the cooler line block to the transmission. Transmission cooler outflow openings 116A and 116B and inflow openings 118A and 118B in the cooler line blocks 100A, 100B are shown in FIGS. 4A, 4B, 12 and 13. Outflow and inflow openings 116A and 118B correspond to respective outflow and inflow lines between the cooler line block 100A, 100B and the transmission, not shown, while outflow and inflow openings 116B and 118B correspond to respective inflow and outflow lines between the cooler line block and the cooler.

Both examples of the cooler line block 100A and 100B have a bore 108 extending from an opening 104 into the body 102. The bore 108 is oriented perpendicularly to the outflow openings 116A, 116B and inflow openings 118A, 118B. However, there is a lip 110 in the bore 108 of the cooler line block 100a. The lip 110 demarks two different diameters within the bore 108 of cooler line block 100A. A larger diameter section 111A of the bore 108 extends above the lip 110 and beneath one or more grooves 106 for accepting a cap and/or clip to secure a valve. A smaller diameter section 111B of the bore 108 extends below the lip 110 towards a bottom 113 of the bore. In the bore 108 of the cooler line block 100B, there is no lip and a diameter D of the bore is consistent along a length L of the bore.

The outflow openings 116A and 116B are offset in both cooler line blocks 100A and 100B, such that the outflow openings do not share a common central axis $A_{OF}$. The inflow openings 118A and 118B are preferably coaxial, and are not typically offset.

A bypass channel 115 extends from the bottom 113 of the bore 108 of each cooler line block 100a, 100b to the bypass opening 117, which fluidly connects the bypass channel and bore to the inflow line 118. Absent the presence of a valve or other structure beyond the cooler line block 100a, 100b, the inflow line 118 in the cooler block body 102 is open to the outflow line 116 through the bypass channel 115, opening 117, and bore 108. Any valve inserted into the bore 108 at least regulates fluid flow through the bypass opening 117 to either allow, limit, or prevent fluid flow to the cooler.

As previously described, the OEM valve for the cooler line block 100a, 100b is defaulted, or under a certain temperature threshold, to a position where the outflow line 116 and inflow line 118 are fluidly connected in the cooler line block. In other words, fluid passes through opening 116A, into the bore 118, through the bypass channel 115, through the opening 117, into the inflow channel, and out through the inflow opening 118A to travel back to the transmission. The OEM valve is therefore defaulted to bypassing fluid flow to the cooler. Over that certain temperature threshold, the OEM valve closes the fluid connection through the opening, or between outflow line 116 and inflow line 118. Fluid is then forced through opening 116A, through the bore 108, out opening 116A to the cooler, back into opening 118B, out opening 118A, and into the transmission.

The OEM valve can also have a partial-on state, where the OEM valve allows some fluid through the opening 117 to bypass the cooler, and some fluid to travel to the cooler and back to the transmission.

Figure 3:
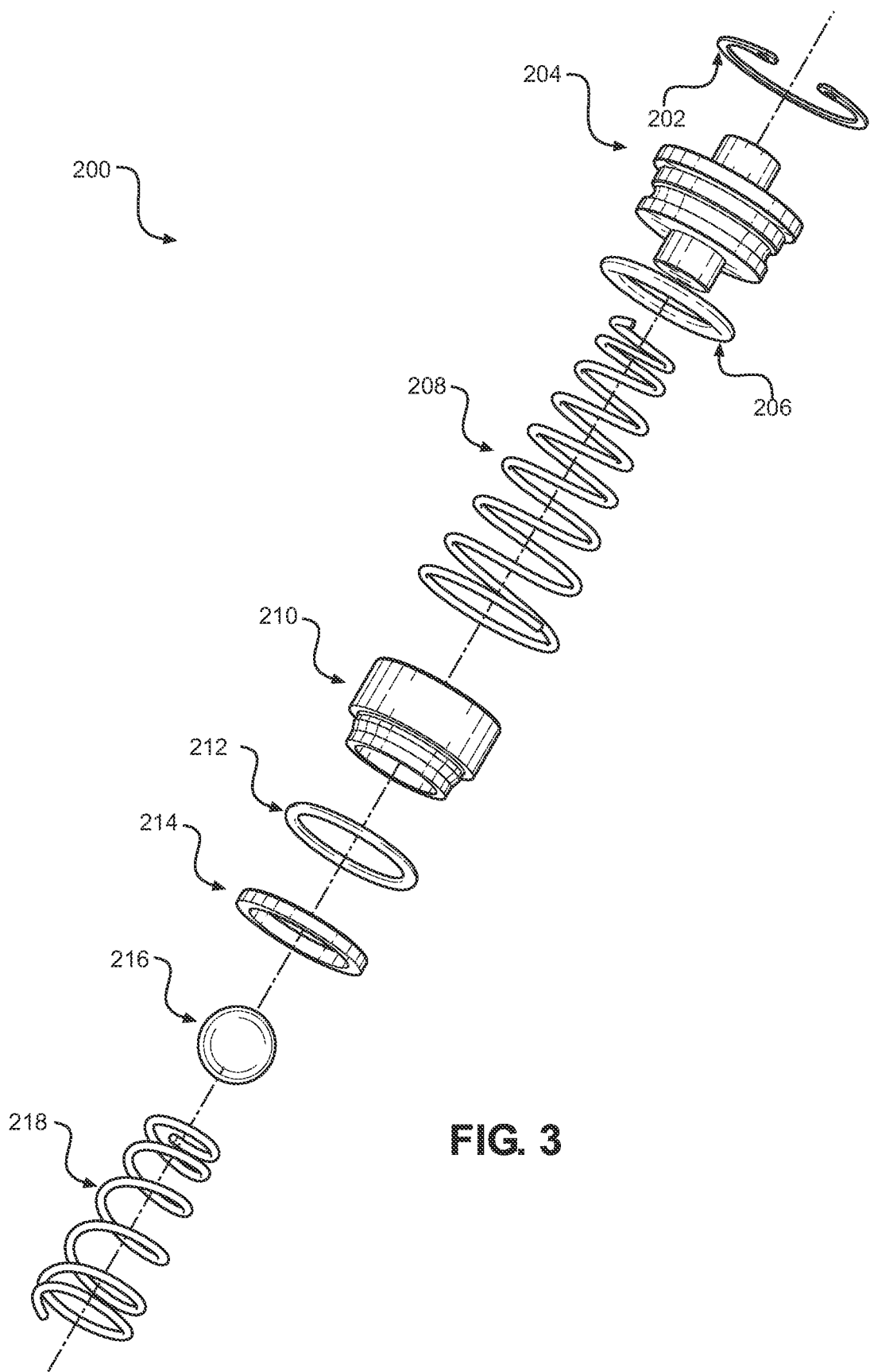
FIG. 3 is an exploded view of a cooler fluid control valve embodiment of the present invention.

FIG. 3 illustrates a preferred embodiment of a thermal bypass control valve 200 insertable in the bore 108 of a cooler line block 100a or 100b with offset openings 116A, 116B for an outflow line. The valve 200 includes a clip 202 insertable in one of the grooves 106 of the cooler line block 100a, 100b to secure a plug 204 within the opening 104. In some embodiments, the clip 202 may be the OEM clip that is reusable with the remaining new parts, i.e. not OEM parts, of the valve 200. The plug 204 closes the opening 104 so that fluid cannot escape the bore 108 through the opening once the valve 200 is properly secured within the bore. A plug ring 206 assists in closing the opening 104 by providing a seal against the bore 108, and between the bore and the plug 204. The plug ring 206 also helps to secure the plug 204 in the opening 104 by providing resistance through friction and compression of the ring between the plug and the bore 108.

A valve seat apparatus 209 sits within the bore 108 along the bottom 103, and includes a valve seat portion 210, a valve seat ring 212, and a spacer 214. The valve seat ring 212 helps to secure the valve seat apparatus in the bore 108 by providing resistance through friction and compression of the ring between the valve seat portion 210 and the bore. A stabilizing spring 208 extends along a partial length of the bore 108 and between the plug 204 and the valve seat 210 to hold the valve seat apparatus against the bottom 113 of the bore 108. A valve member 216 and a valve member spring 218 are positioned on an opposite side of the valve seat apparatus 209 to the stabilizing spring 208. The valve member spring 218 preferably extends within the bypass opening 115 and movably secures the valve member 216 between the valve spring and valve seat apparatus 209.

Figure 4A:
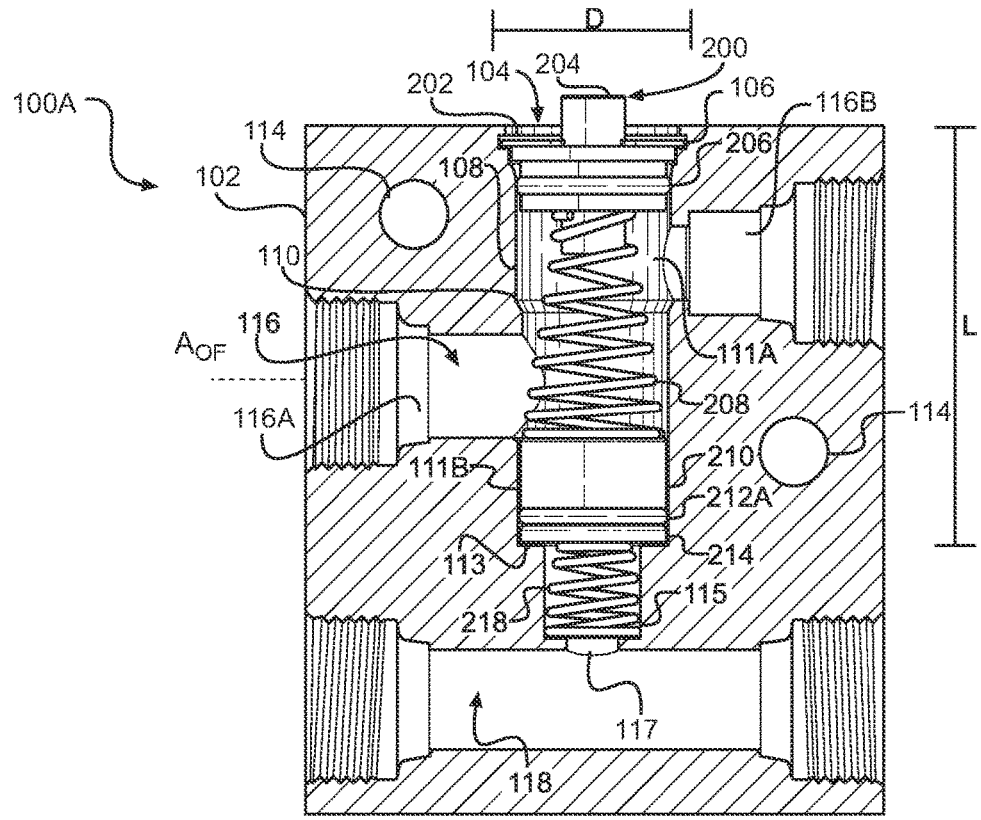
FIG. 4A is cross-sectional view of the cooler line block of FIG. 1, with a thermal bypass control valve embodiment inserted within a bore of the cooler line block to replace an OEM fluid control valve.
Figure 4B:
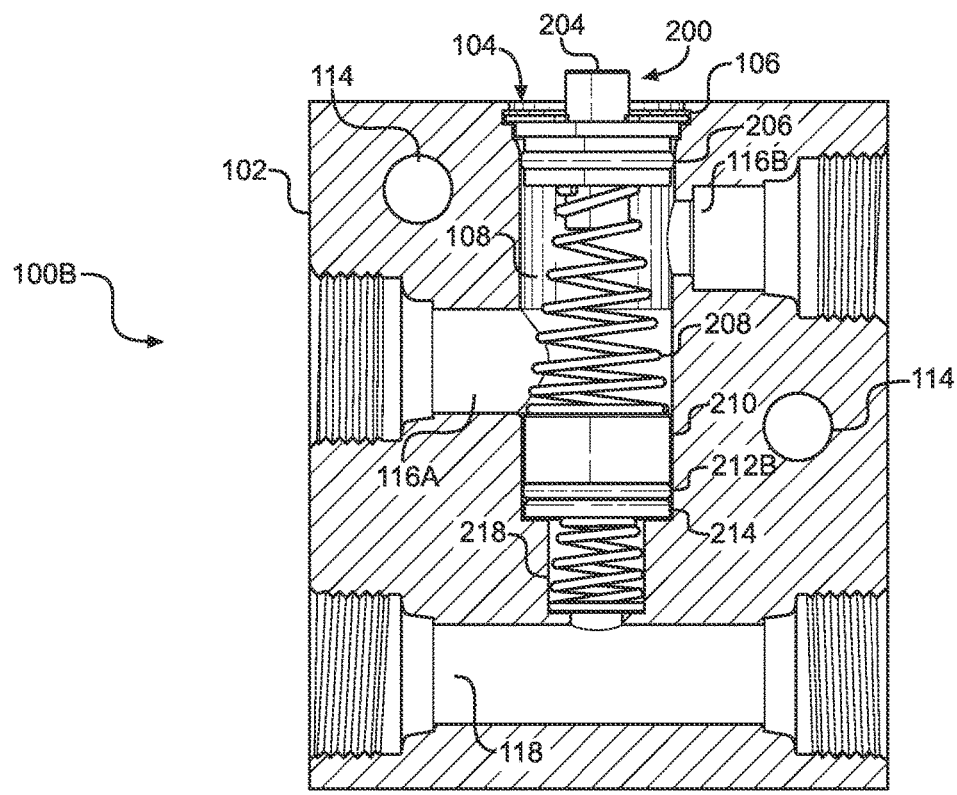
FIG. 4B is cross-sectional view of the cooler line block of FIG. 2, with a thermal bypass control valve embodiment inserted within a bore of the cooler line block to replace an OEM thermal bypass control valve.

FIGS. 4A and 4B show the thermal control system valve 200 installed in a cooler line block 100A and 100B, respectively. FIG. 4A shows the lip 110 of cooler line block 110A, which is not present in the cooler line block 100B. In both cooler line blocks 100A and 100B, the same components of the thermal control system valve 200 are used, with the exception of the valve seat ring 212. With the cooler line block 100A, a valve seat ring 212A is used. With the cooler line block 100B, a valve seat ring 212B is used. The valve seat ring 212A has a smaller diameter than valve seat ring 212B to compensate for the smaller diameter of the lower portion 111B of the bore 108 in block 100A.

In cooler line block 100A, which includes the lip 110, the upper portion 111A of the bore 108 has a diameter of 0.687 inches ("), or 17.449 millimeters (mm), and the lower portion 111B of the bore has a diameter of 0.657" (16.687 mm). In cooler line block 100B, which does not include the lip 110, the bore 108 has a diameter of 0.687" (17.449 mm) along the entire length of the bore. The valve seat ring 212B is thicker in diameter and has a larger outer circumference than the valve seat ring 212A to properly secure the valve seat apparatus 209 within the bore 108 of cooler line block 100B.

Figure 5:
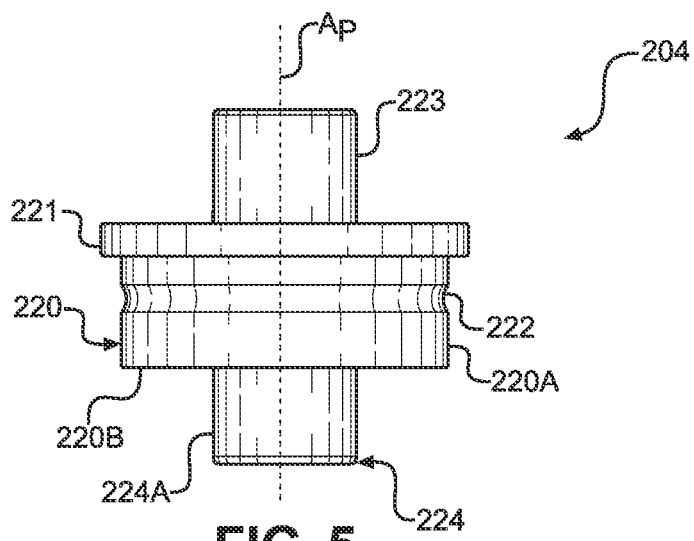
FIG. 5 is a side view of a plug of the thermal bypass control valve embodiment of FIG. 3.

The plug 204, as shown in FIG. 5, has a cylindrical body 220 that fits coaxially through the opening 104 and is insertable along a length of the cylindrical body into the bore 108. The plug 204 also includes a cylindrical cap portion 221, an outer member 223, and an inner member 224. The inner member 224 has an outer surface 224A that is engageable with the stabilizing spring 208. The cap portion 221 is cylindrical and positioned between the outer member 223 and the body 220. The cap portion 221 is coaxial with the body 220, and has a greater diameter than the body. The cap portion 221, when the valve 200 is secured within the cooler line body 100a, 100b, acts to help close the opening 104 to prevent fluid from escaping through the opening. The inner member 224 extends from the body 220 in an opposite direction relative to the outer member, which extends from the cap portion 221. The body 220, the cap portion 221, the outer member 223, and the inner member 224 are all preferably coaxially arranged along a central plug axis $A_p$. A plug ring groove 222 extends along a circumference of an outer surface 220a of the body 220. The plug ring groove 222 is shaped to accept the plug ring 206.

Preferred dimensions of the plug 204 will be described next, with length dimensions being oriented along, or parallel to, the same axis $A_p$ and the diameter or width dimensions oriented perpendicularly to the axis $A_p$. The outer member 223 preferably has a length of 0.230" (5.842 mm) and a diameter of 0.300" (7.620 mm). The cap portion 221 preferably has a length of 0.066" (1.676 mm) and a diameter of 0.770" (19.558 mm). The body 220 preferably has a length of 0.160" (4.064 mm) and a diameter of 0.678" plus or minus (+/−) 0.001" (17.221 mm+/−0.025 mm). The groove 222 preferably has a length of 0.078" (1.981 mm) and a diameter of 0.587"+/−0.001" (14.910 mm+/−0.025 mm). The inner member preferably has a length of 0.150" (3.810 mm) and a diameter of 0.265" (6.731 mm).

The plug ring 206 is insertable within the plug ring groove 222, such that a portion of the thickness of the plug ring extends beyond the plug ring groove and the body 220 of the plug 204 when positioned within the plug ring groove. When the valve 200 is inserted into the bore 108, the plug ring 206 is secured between the bore and the plug 204, while positioned within the plug ring groove 222. In this position, the plug ring 206 creates an additional seal to help prevent leakage of the pressurized fluid within the cooler line block 100a, 100b, along with the cap portion 221.

Figure 6A:
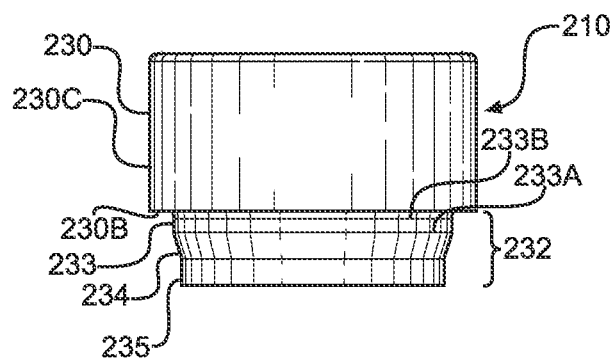
FIG. 6A is a side view of a valve seat portion of the thermal bypass control valve embodiment of FIG. 3.
Figure 6B:
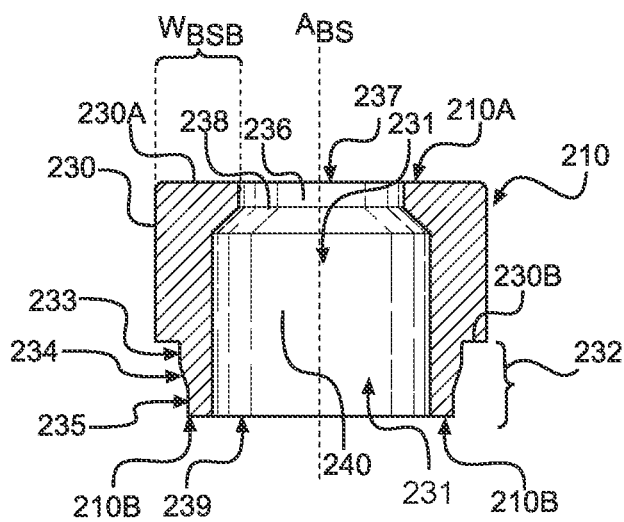
FIG. 6B is a cross-sectional view of the valve seat portion of FIG. 6A.

FIGS. 6A and 6B illustrate the valve seat portion 210, which is assembled with the valve ring 212 and spacer 214 to form the valve seat apparatus 209. The valve seat portion 210 includes a cylindrical valve seat body 230 and an insertable element 232, which extends from a bottom surface 230B of the valve seat body. A top surface 230A of the valve seat body 230 has a width $W_{bsb}$ to accommodate a wide end 297 of the stabilizing spring 208 when the valve 200 is positioned within the bore 108. Preferably, the width $W_{bsb}$ is 0.164"+/−0.0005" (4.166 mm+/−0.013 mm).

The insertable element 232 has a base portion 233 adjacent to and extending from the bottom surface 230B. Preferably, at least a partial length of the base portion 233 extends perpendicularly from the bottom end 230b, although the base portion may extend at an angle off 90 degrees relative to the base portion in other embodiments. The base portion 233 may include both an angled surface 233B and a parallel surface 233A, relative to a central valve seat axis $A_{BS}$, such that the angled surface is adjacent to the bottom surface 230B and the parallel surface extends from the angled surface.

A neck portion 235 is connected to the base portion 233 by a transition portion 234. The neck portion 235 has an overall diameter that is less than an overall diameter of the parallel surface 233A of the base portion 233. The neck portion 235 is preferably perpendicularly oriented relative to the bottom surface 230b of the valve seat body, and is adjacent to a bottom surface 210B of the valve seat portion 210. The transition portion 234 has an overall diameter that changes along its length, and decreases in diameter from the base portion 233 to the neck portion 235.

A channel 231 runs centrally through the valve seat portion 210 and is open at openings 237 and 239 along the top surface 210A and the bottom surface 210B of the valve seat portion 210, respectively. The channel 231 includes a first cylindrical surface 236, a frusto-conical surface 238, and a second cylindrical surface 240. The cylindrical surface 236 extends from the opening 237 along a partial length of the valve seat portion 210 to adjacent to the frusto-conical surface 238. The frusto-conical surface 238 extends between and adjacent to the first cylindrical surface 236 and the second cylindrical surface 240, which extends from the opening 239 along a partial length of the valve seat portion 210 to adjacent to the frusto-conical surface 238. The cylindrical surface 236 and the frusto-conical surface 238 meet along a shared edge within the channel 231. A diameter of the first cylindrical surface 236 is smaller than the valve member 216 such that the valve member cannot pass through the channel 231 along the first cylindrical surface. A diameter of the frusto-conical surface 238 changes along its length, and likewise, at least along a partial length, has a smaller diameter than the valve member 216. From the opening 239, the second cylindrical surface 240 has a large enough diameter to accept at least a portion of the valve member 216, such that the valve member is capable of blocking fluid flow through the channel 231. This may mean that the valve member 216 is sized to block fluid flow through a portion of the channel including only the first cylindrical surface, the frusto-conical surface 238, and/or the second cylindrical surface 240.

Preferred dimensions of the valve seat portion 210 will be described next, with length dimensions being oriented along, or parallel to, the valve seat axis $A_{Bs}$ and the diameter or width dimensions oriented perpendicularly to the valve seat axis $A_{BS}$. The body 230 preferably has a length of 0.300" (7.620 mm) and a diameter of 0.648"+/−0.001" (16.459 mm+/−0.025 mm). The base portion 233 preferably has a length of 0.050" (1.270 mm) and a diameter of 0.556"+/−0.001" (14.122 mm+/−0.025 mm). The transition portion 234 preferably has a length of 0.050" (1.270 mm) and a diameter that changes from 0.556"+/−0.001" (14.122 mm+/−0.025 mm) to 0.523"+/−0.001 (13.284 mm+/−0.025 mm). The neck portion 235 preferably has a length of 0.050" (1.270 mm) and a diameter of 0.523"+/−0.001" (13.284 mm+/−0.025 mm). The cavity 231 has a total length of 0.450" (11.430 mm). The first cylindrical surface 236 has a length of 0.070" (1.778 mm) and a diameter of 0.320" (8.128 mm). The second cylindrical surface 240 has a length of 0.350" (8.890 mm) and a diameter of 0.421" (10.693 mm). The frusto-conical surface 238 has a length of 0.030" (0.762 mm) and changes diameter from 0.320" (8.128 mm) to 0.421" (10.693 mm).

The valve seat body 230, insertable element 232, and cavity 231 are preferably oriented coaxially along the valve seat axis $A_{Bs}$, along with their respective substructures, such as the first cylindrical surface 236, the frusto-conical surface 238, the second cylindrical surface 240, the base portion 233, transition portion 234, and the neck portion 235.

The valve seat ring 212 is securably slidable over the insertable portion 232 of the valve seat portion 210, including the base portion 233, transition portion 234, and the neck portion 235. The valve seat ring 212 is preferably flexible and/or expandable to initially be secured around the neck portion 235, then slidably engaged over the transition portion 234, and then slidably engaged over the base portion 233. The valve seat ring 212 provides a friction coefficient to help secure the valve seat apparatus 209 in the bore 108.

Figure 9:
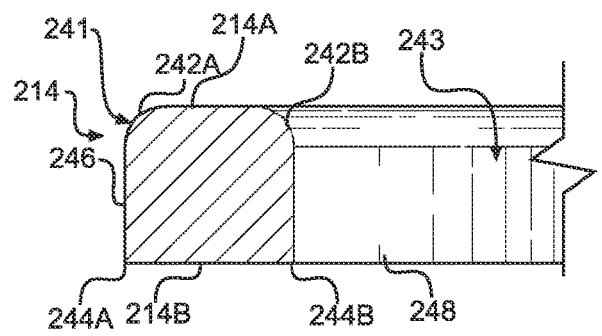
FIG. 9 is a cross-sectional view of a portion of a spacer of the thermal bypass control valve embodiment of FIG. 3.

FIG. 9 illustrates half of the cylindrical spacer 214 along a cross-section taken through a central lateral axis. The remaining view of the spacer 214 along the cross-section would mirror the portion shown in FIG. 9. The spacer 214 includes a body 241 with an outer circumferential surface 246 and an inner circumferential surface 248. An upper surface 214A of the body 241 includes edges, preferably two rounded edges 242A and 242B. A bottom surface 214B of the body 241 includes edges, preferably two square edges 244A and 244B. The outer circumferential surface 246 and the inner circumferential surface 248 are oppositely oriented to each other, but both adjacent to the upper surface 214A and the bottom surface 214B. The spacer body 241 is therefore preferably rectangular along the cross-section, with the exception of the two rounded edges 242A and 242B. An overall diameter of the spacer 214, or diameter of the outer circumferential surface 246 is preferably similar to the diameter of the valve seat body 230. The diameter of the outer circumferential surface 246 is preferably between 0.651"-0.655" (16.535 mm-16.637 mm). An inner diameter of the spacer 214, measured between opposite sides of the inner circumferential surface 248, preferably matches, or is slightly larger than, the diameter of the neck portion 235. The diameter of the outer circumferential surface 246 is preferably between 0.536"-0.540" (13.614 mm-13.716 mm). The neck portion 235 is slidably engageable within an opening 243 of the spacer 214, the opening being defined by the inner circumferential surface 248. A length of the spacer 214 is preferably 0.075"-0.080" (1.905 mm-2.032 mm).

Figure 8:
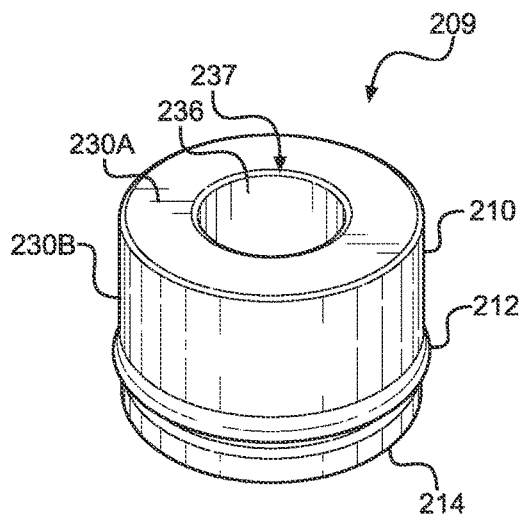
FIG. 8 is a perspective view of a valve seat apparatus of the thermal bypass control valve embodiment of FIG. 3.

FIG. 8 shows the valve seat apparatus 209 in its final configuration after installation of the valve 200 in the bore 108. The valve seat ring 212 is positioned around the base portion 233 of the insertable element 232. The neck portion 235 is insert in the opening 243 with the spacer 214 positioned around the neck portion. The valve seat ring 212 partially extends beyond a circumferential surface 230C of the body 230 and the outer circumferential surface 246.

Figure 11A:
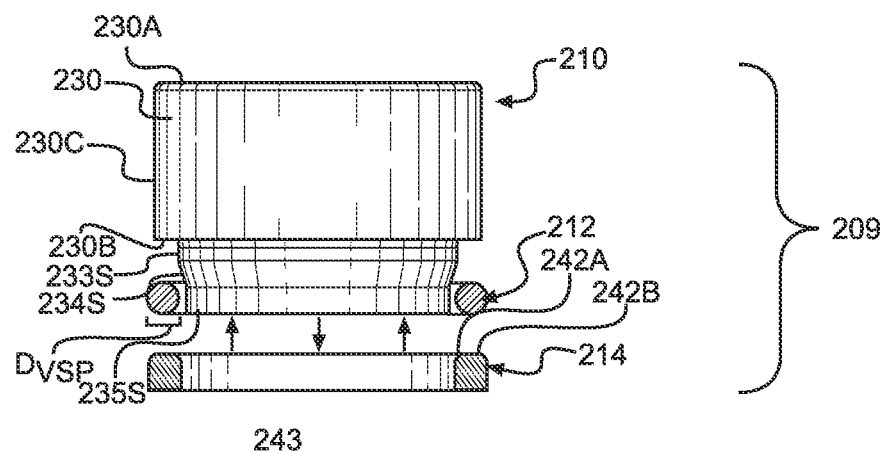
FIG. 11A is a cross-sectional view of a valve seat portion, a valve seat ring, and a spacer before the spacer is secured to the valve seat portion.
Figure 11B:
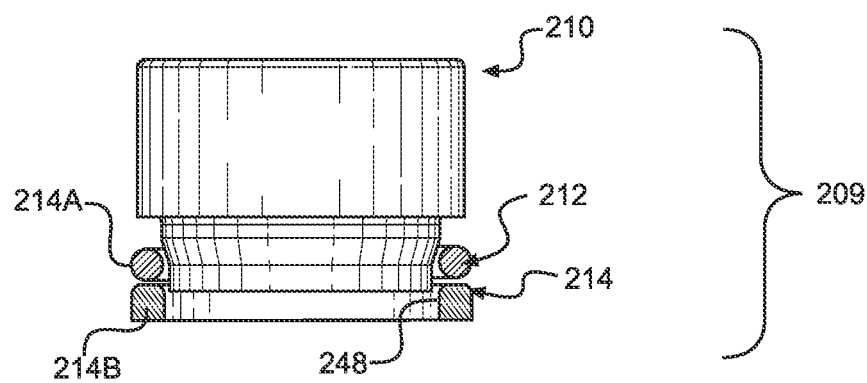
FIG. 11B is a cross-sectional view of the valve seat portion, the valve seat ring, and the spacer of FIG. 11A, with the spacer pushing the valve seat ring along a transitional surface of the valve seat portion.
Figure 11C:
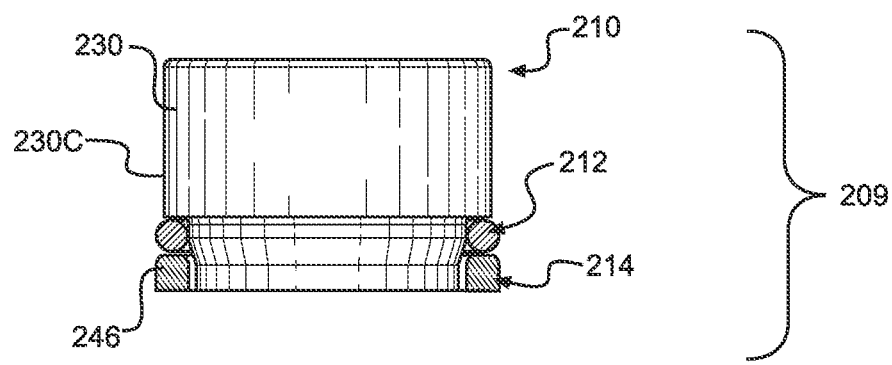
FIG. 11C is a cross-sectional view of the valve seat portion, the valve seat ring, and the spacer of FIG. 11B, with the spacer secured around a neck portion of the valve seat portion and the valve seat ring secured around a base portion of the valve seat portion.

FIGS. 11A, 11B, and 11C show assembly of the valve seat apparatus 209 during valve 200 installation in the bore 108 along a similar cross-section of the valve seat portion 210, valve seat ring 212, and spacer 214.

In FIG. 11A, the valve seat ring 212 is positioned around an outer circumferential surface 235S of the neck portion 235 of the insertable element 232. The spacer 214 is oriented such that upper surface 214A and rounded edges 242A and 242B are facing the valve seat portion 210. The spacer 214 and valve seat portion 210 are further oriented such that the neck portion 235, and/or the insertable element 232, is coaxial with the opening 243 of the spacer 214, which are also preferably coaxial, to align the neck portion with the opening 243.

In FIG. 11B, the neck portion 235 of the insertable element 232 is partially inserted into the opening 243 such that the outer circumferential surface 235S slidably engages the inner circumferential surface 248 of the spacer 214 along a partial length. In turn, this pushes or slides the valve seat ring 212 to a position along the outer circumferential surface 234S of the transitional portion 234. Importantly, no portion of a thickness of the valve seat ring 212 extends beyond the valve seat portion 210 or the spacer 214. In other words, the spacer 214 and/or the valve seat portion 210 have the larger overall diameters in this configuration than the valve seat ring 212. While the spacer 214 is attached to the valve seat portion 210, the valve seat apparatus 209 is not yet in a final functional configuration. This configuration, an installable configuration, allows the valve seat apparatus 209 to be inserted within the bore 108 such that the bottom surface 214b of the spacer 214 contacts against the bottom 113 of the bore.

In FIG. 11C, once the valve seat apparatus configuration of FIG. 11B is inserted in the bore 108 such that the bottom surface 214b of the spacer 214 lays flat against the bottom 113, the insertable element 232 is fully inserted into the opening 243 such that the valve seat ring 212 slidably engages around an outer circumferential surface 233S of the base portion 233. The diameter of the base portion 233 is larger than the diameters of the transitional portion 234 and neck portion 235 such that a partial thickness of the valve seat ring 212 extends beyond the valve seat portion 210 and spacer 214 to sealably engage the bore 108 to direct fluid flow through the channel 231 and not along the outer surfaces 230C and 246 of the valve seat portion 210 and spacer 214, respectively. In other words, in this configuration, the valve seat spacer 212 has a larger overall diameter than the valve seat portion 210 and the spacer 214. This configuration, an installed configuration, is also shown in FIG. 8, and allows the valve member 216 to prevent or allow fluid bypass through the channel 231.

Figure 7:
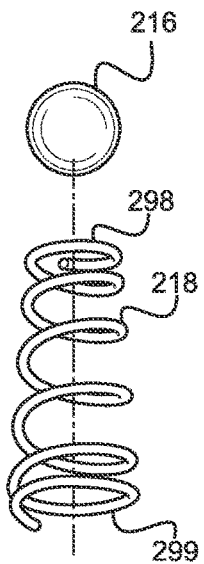
FIG. 7 is an exploded view of a valve member and valve spring of the thermal bypass control valve embodiment of FIG. 3.

FIG. 7 illustrates an embodiment of the valve member 216 and the valve spring 218. The valve member 216 is spherical and in the shape of a ball in this embodiment. However, the valve member 216 may be differently shaped to achieve a similar function, namely preventing or allowing fluid passage through the channel 231 of the valve seat apparatus 209 under certain given fluid pressure states. Such shapes include a conical or frusto-conical structure to complement the frusto-conical surface 238 of the channel 231, cylindrical structure, or a capsule structure being a cylinder with one or more hemispherical ends, i.e. a spherocylinder.

The valve spring 218, in conjunction with the valve member 216, metering fluid passage through the channel 231 of the valve seat apparatus 209. Under high pressure situations in the outflow cooler line 116, the valve member 216 is depressed into the valve spring 218 causing the valve spring to contract. The valve member 216 is moved such that it is no longer blocking fluid flow through the cavity 231. This allows fluid to pass from the outflow line 116A through the channel 231, and back through the inflow line 118A. This bypasses the cooler and sends the fluid back to the transmission. While the fluid is not cooled in this scenario, in high temperature conditions, even uncooled fluid helps to control and/or reduce temperature. Under sufficiently low pressure, the valve member 216 remains in sealed contact with the channel 231, or contacts the channel in such a way that fluid does not pass from the outflow lines to the inflow lines via the channel.

In the preferred embodiment, the valve spring 218 has opposing ends 298 and 299 with different diameters. The end 298 has a smaller diameter than the end 299, as the end 298 is sized to hold and interact with a spherical valve member 216, and to fit within the channel 231 along the second cylindrical surface 240. The end 299 is larger in diameter and sized to interact with a bottom surface 115A of the bypass channel 115. In this manner, the valve spring is compressible between the valve member 216 and the bottom surface 115A of the bypass channel 115. While the valve spring 218 has a frusto-conical shape in this embodiment, it may be differently shaped to properly cooperate with different shapes of the valve member 216 and channel 231 to meter fluid bypass flow in response to changing fluid temperature and pressure.

Figure 10:
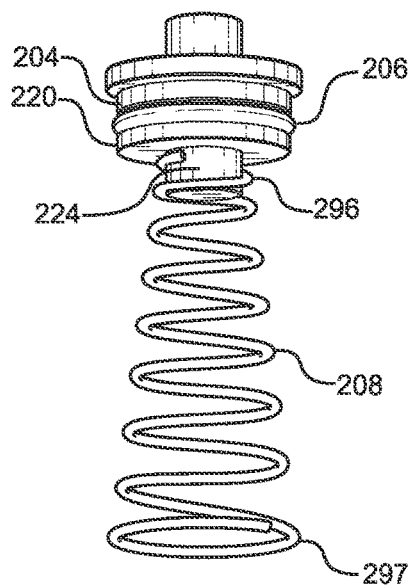
FIG. 10 is a perspective view of the plug, a plug ring, and stabilizing spring of the thermal bypass control valve embodiment of FIG. 3 operationally secured together.

FIG. 10 illustrates the stabilizing spring 208 secured to the plug 204. The stabilizing spring has two opposing ends 296 and 297. The end 296 has a smaller diameter than the end 297, as the end 296 is sized to slidably engage over the inner member 224 of the plug 204 and interact with surface 220B of the body 220. The end 297 is larger and sized to interact with surface 230a of the valve seat portion 210. In this manner, the stabilizing spring 208 is compressible between the plug 204 and the valve seat portion 210 along surfaces 220B and 230A, respectively. While the stabilizing spring 208 has a frusto-conical shape in this embodiment, it may be differently shaped to properly cooperate with different shapes of the inner member 224 and valve seat portion 210 to properly stabilize the valve seat apparatus 209 within the bore 108 and against the bottom 113 of the bore.

Figure 12:
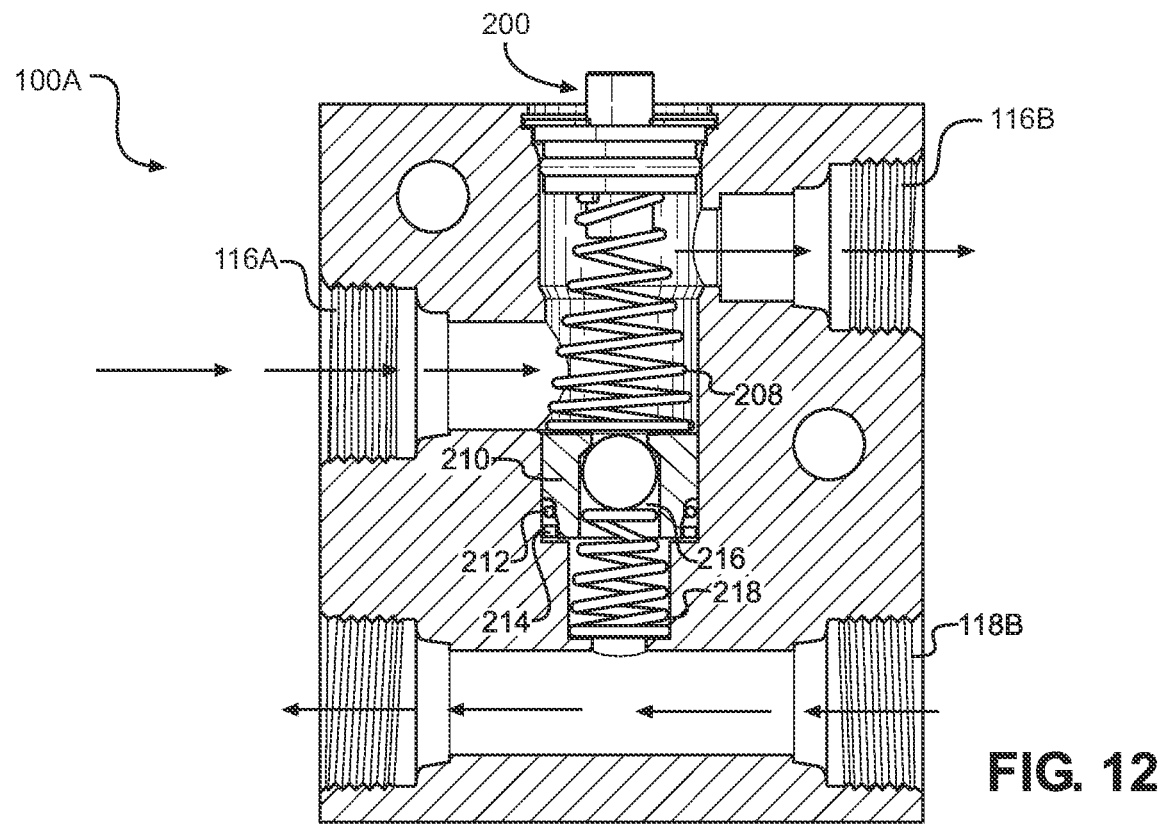
FIG. 12 is an illustration of the thermal bypass control valve embodiment of FIG. 3 installed in the bore of the cooler line block, the cooler fluid control valve in a closed configuration.
Figure 13:
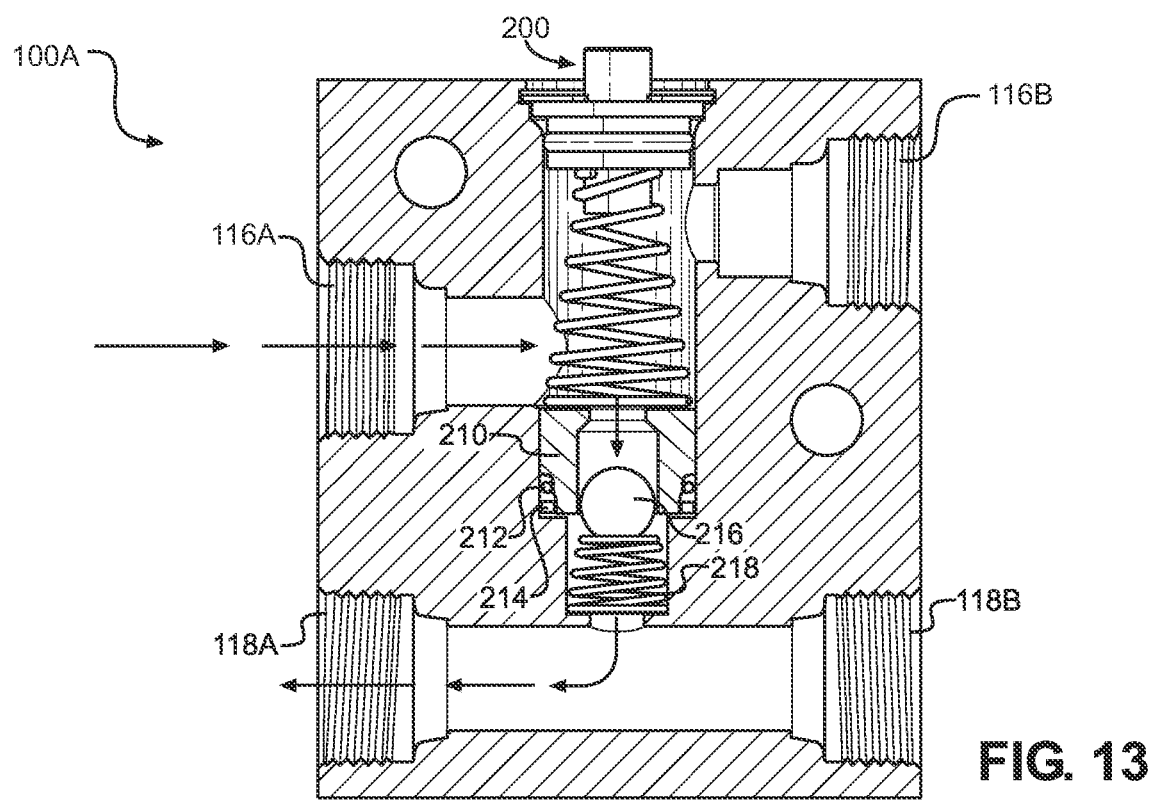
FIG. 13 is an illustration of the thermal bypass control valve embodiment of FIG. 11, the cooler fluid control valve in an open configuration.

FIG. 12 illustrates the valve 200 in a normal flow condition and FIG. 13 illustrates the valve in a bypass flow condition. In the normal flow condition fluid pressure is low enough that the valve spring 218 is not compressed by the valve member 216. The valve member 216 therefore seals the channel 231 of the valve seat apparatus 209 preventing fluid flow through the bypass opening 117. Fluid flow is therefore directed from outflow line opening 116A into the cooler line block 100a, 100b, through the bore 108 between the plug 204 and valve seat apparatus 209, through the outflow line opening 116B to the cooler, and back to the cooler line block via inflow line opening 118B, then back to the transmission via inflow line opening 118A.

Under sufficiently high fluid pressure in the bore 108, the valve member 216 is forced to compress the valve spring 218 and allow fluid flow through the channel 231, past the valve member and spring, through the bypass channel 115 and opening 117, and into the inflow line 118 back to the transmission via inflow line opening 118A. In this situation, fluid temperature in the transmission has reached a threshold that even a supply of uncooled fluid bypassing the cooler helps to alleviate fluid pressure in the system. Once temperature is reduced, and fluid pressure correspondingly reduces, to sufficient levels, the valve spring 218 expands back to press the valve element 216 into the channel 231 to seal off fluid bypass and once again direct fluid to the cooler. The tension of the valve spring 216 can be altered to change the pressure threshold at which the valve 200 switches between the closed and open configurations of FIGS. 12 and 13.

The thermal bypass control valve 200 of the present invention may also be used in a reverse flow operation, in which flow through the cooler lines and block is reversed. In this configuration, for example, fluid would flow from the transmission to the block at line opening 118A, out to the cooler at line opening 118B, back to the cooler block at line opening 116B, and out to the transmission at line opening 116A.

The valve 200 embodiment of FIG. 3 is preferably used in GM, Allison, and Ford transmissions, but may be used with any other compatible transmission.

Figure 14:
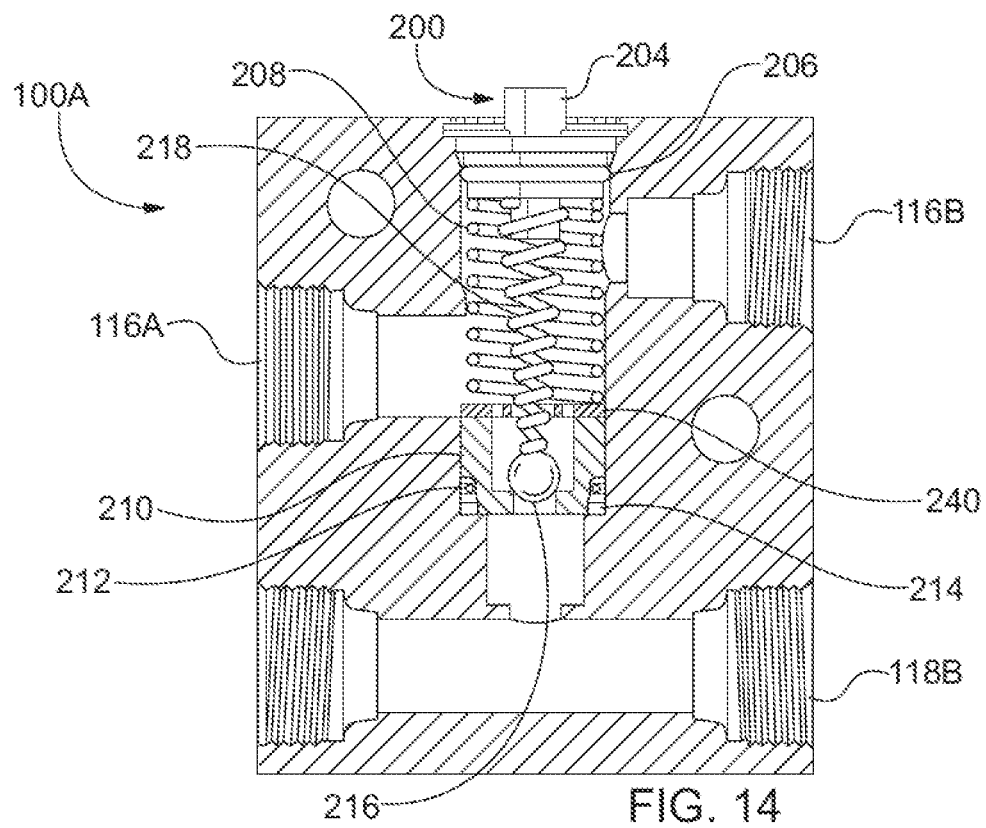
FIG. 14 is an illustration of an alternate thermal bypass control valve embodiment installed in a bore of a cooler line block, a cooler fluid control valve in a closed configuration.
Figure 15:
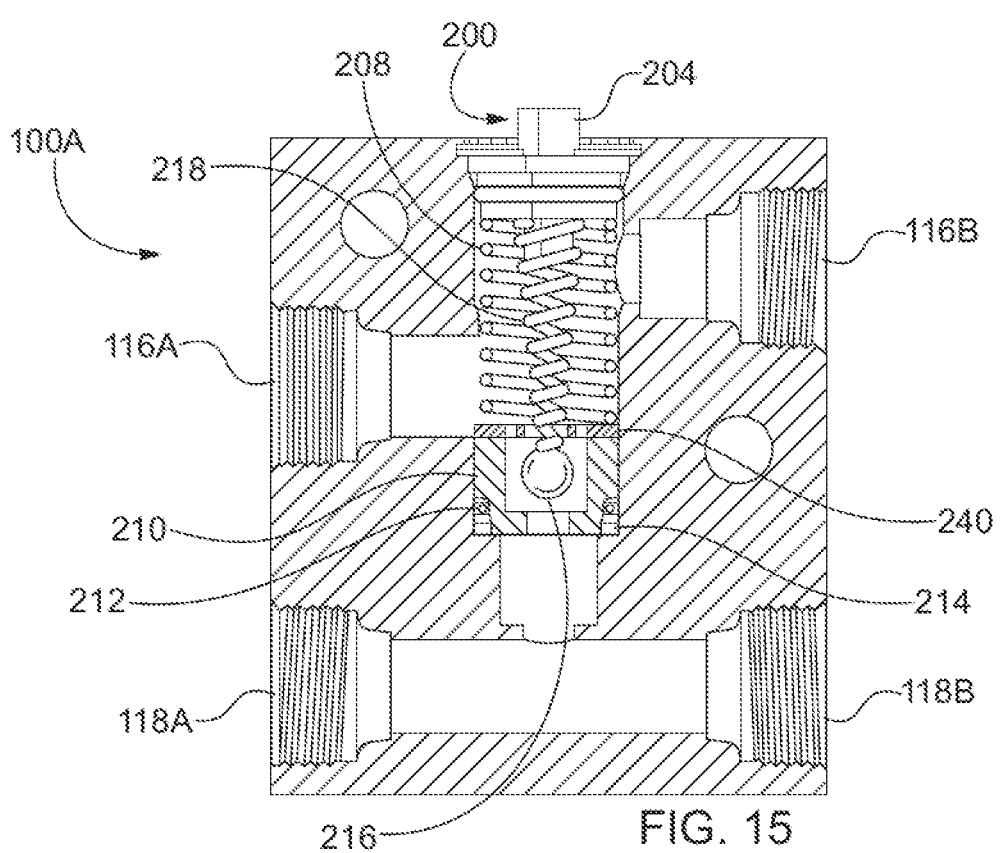
FIG. 15 is an illustration of the thermal bypass control valve embodiment of FIG. 14, the cooler fluid control valve in an open configuration.

An alternative embodiment of a thermal bypass control valve 200 is shown in FIG. 14. The thermal bypass control valve 200 includes a clip 202, a plug 204, a plug ring 206, a spring 208, a valve seat portion 210, a valve seat ring 212, a spacer 214, a valve member 216, a spring 218, and a cap 240. The clip 202, plug 204, plug ring 206, valve seat ring 212, spacer 214, and valve member 216 of the valve 200 embodiment of FIG. 14 are substantially identical to the similarly-numbered structures provided for the valve embodiment of FIG. 3.

A valve seat portion 210 of the valve embodiment of FIG. 14 is similar to the valve embodiment of FIG. 3, but shaped slightly differently to accommodate the repositioning of spring 18. In FIG. 14, the shape of the channel 231 is longitudinally flipped, such that the first cylindrical surface 236 and frusto-conical surface 238 are located at the bottom of the valve seat portion 210, adjacent to the bottom surface 210B. Likewise, the second cylindrical surface 240 is adjacent to the top surface 210A. In this configuration, the cavity 231 is narrower at a top than at a bottom. The valve member 216 still movably engages against the frusto-conical surface 238. Surface 238 may optionally be oriented perpendicularly to surfaces 240 and 236 to form a right angle. The diameter of the cavity 231 may vary to accommodate the spring 218. All other reference numbers provided in FIGS. 6A-6B, and their corresponding structures, are otherwise similar and applicable to the valve seat portion 210 of FIG. 14.

Figure 16:
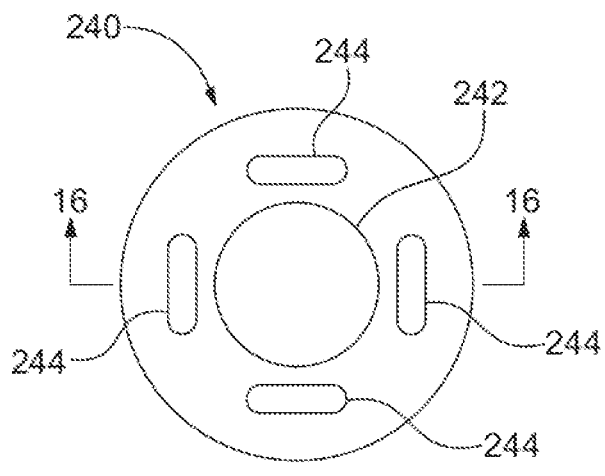
FIG. 16 is a top plan view of a cap for the cooler fluid control valve of FIG. 14.
Figure 17:
FIG. 17 is a cross-sectional view of the cap of FIG. 16.

A cap 240, shown in FIGS. 16 and 17, rests against the top surface 210A of the valve seat portion 210. A central opening 242 in the cap 240 allows the spring 218 to pass through the cap and into the channel 231. A plurality of secondary openings, or flow openings, 244 also extend through the cap and open into the channel 231. Each opening of the plurality of openings 244 preferably has a diameter of 2.1336 mm to 3.175 mm (0.084 in. to 0.175 in.), inclusive. However, other sizes are contemplated as necessary to properly calibrate fluid flow.

The spring 208 extends longitudinally between the plug 204 and the cap 240, resting against the surface 220B and a top surface of the cap, respectively. The spring 208 provides force against the cap 240 and the valve seat portion 210 to keep both of those structures secure within the bore of the cooler line block.

The spring 218, secured around the inner member 224 of the plug 204 at one end, extends downwardly from the plug, through the cap 240, partially within the cavity 231, and against the valve member 216. The spring 218 is configured to compress and expand in response to forces acting on the valve member 216. Preferably, the spring 218 is positioned inside and coaxially with the spring 208. The spring 218 is preferably calibrated for 172.369 kPa (or 25 PSI).

Once installed in the bore of the cooler block, the valve 200 embodiment of FIG. 14 is configured to constantly supply fluid from the transmission to the cooler and then back to the transmission, as provided in FIG. 14. The valve member 216 sits within the channel 231 and blocks fluid flow through the valve seat portion 210. If a blockage occurs in the cooler, fluid bypass of the cooler is possible. In the case of such a blockage, fluid pressure forces the valve member 216 to act against and compress the spring 218. This allows fluid to flow through the valve seat portion 210 via the channel 231 and out through the plurality of openings 244 in the cap 240 to bypass the cooler and return to the transmission through the appropriate cooler lines.

The valve 200 embodiment of FIG. 14 is preferably used in Chrysler, Nissan, and/or Mercedes transmissions, but may be used with any other compatible transmission.

It should be understood that the thermal bypass control valve 200 embodiments described herein may be used across various cooler blocks, including OEM part nos. 55111005AC and 68192000AA. The thermal bypass control valve 200 embodiments may also be used in cooler line blocks than have offset or in-line channels (i.e. line openings 116A/116B are shown offset, but may be in-line as with line openings 118A/118B). Further, the thermal bypass control valve 200 embodiments may be used with four channel or three channel cooler blocks.

Unless otherwise specified, the various alterations and additional embodiments of constituent parts and structures discussed in regards to one or more thermal bypass control valve 200 embodiments are interchangeable and applicable to other thermal bypass control valve embodiments, even if not explicitly stated.

We claim:

1. A thermal bypass control valve insertable in a bore of a cooler line block, comprising:
   a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;
   a plug ring insertable within the plug ring groove, wherein a thickness of the plug ring partially extends beyond the cylindrical body of the plug when inserted within the plug ring groove;
   a valve seat apparatus having a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion, a valve seat ring insertable over the insertable portion of the valve seat portion, and a cylindrical spacer slidable over the neck portion of the insertable portion;

a stabilizing spring configured to be positionable between the plug and the valve seat apparatus to secure the valve seat apparatus in a fixed position within the bore;

a valve member, and a valve spring, the valve spring securable at a base end against a bottom of the bore and against the valve member at a valve spring end, wherein the valve spring secures the valve member against a surface of the cavity in a closed configuration, and the valve spring compresses to move the valve member away from the surface of the cavity in an open configuration.

2. The thermal bypass control valve of claim 1, wherein the stabilizing spring further comprises a base end and a receiving end, the receiving end having a smaller diameter than the base end, and wherein the inner member is insertable within the smaller diameter of the receiving end and the base end is securable against an upper surface of the valve seat body.

3. The thermal bypass control valve of claim 1, wherein the cavity of the valve seat portion includes a cylindrical cavity portion and a frusto-conical cavity portion.

4. The thermal bypass control valve of claim 3, wherein the valve member contacts the frusto-conical cavity portion in the closed configuration.

5. The thermal bypass control valve of claim 1, wherein the plug ring and valve seat ring are elastically deformable and provide a friction coefficient to secure to the plug and ball seat portion within the bore.

6. The thermal bypass control valve of claim 1, wherein the cylindrical spacer has a squared edge along a bottom inner edge and a bottom outer edge, and has a curved edge along a top inner edge and a top outer edge.

7. The thermal bypass control valve of claim 6, wherein the cylindrical spacer is positioned with the top inner edge and top outer edge oriented toward the valve seat body.

8. The thermal bypass control valve of claim 1, wherein the stabilizing spring extends within the bore between offset channels for an outflow line.

9. The thermal bypass control valve of claim 1, wherein the valve seat apparatus is positioned within the bore such that it does not reduce an opening of an outflow line.

10. The thermal bypass control valve of claim 1, wherein the valve seat portion further comprises a transition portion oriented between the base portion and the neck portion.

11. The thermal bypass control valve of claim 10, wherein, before the valve seat apparatus is inserted into the bore, the valve seat ring is positioned around the neck portion, and the neck portion is inserted into an opening in the cylindrical spacer.

12. The thermal bypass control valve of claim 11, wherein, when the valve seat apparatus inserted into the bore, the valve seat ring is forced around the base portion and held between the base seat portion and the cylindrical spacer.

13. A method of improving fluid flow through a transmission thermal control fluid system, comprising:
a) removing an original equipment manufacturer (OEM) thermal bypass control valve from the bore of a cooler line block with offset channels; and
b) inserting the thermal bypass control valve of claim 1 into the bore of the cooler line block.

14. The method of claim 13, wherein the bore has a uniform diameter along its length.

15. The method of claim 13, wherein the bore comprises an upper portion and a lower portion, the lower portion having a smaller diameter than the upper portion.

16. The method of claim 15, further comprising using a modified valve seat ring to compensate for the smaller diameter of the lower portion of the bore.

17. The method of claim 13, furthering comprising, before step b), inserting the valve seat ring over the neck portion, inserting the spacer in the bore, inserting the valve seat portion with the valve seat ring over the neck portion into the bore, and forcing the valve seat ring around the base portion by pressing the neck portion within an inner circumference of the spacer.

18. The method of claim 13, furthering comprising, before step b), inserting the valve seat ring over the neck portion, inserting the neck portion into an opening in the spacer, inserting the valve seat apparatus into the bore, and forcing the valve seat ring around the base portion by pressing the neck portion further into the opening of the spacer.

19. A thermal bypass control valve insertable in a bore of a cooler line block, the valve comprising:
a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having
a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion, a valve seat ring insertable over the insertable portion of the valve seat portion, and a cylindrical spacer slidable over the neck portion of the insertable portion;

a cap having a central opening and a plurality of openings, the plurality of openings arranged around the central opening;

a stabilizing spring configured to be positionable between the plug and the cap to secure the cap and the valve seat portion in a fixed position within the bore;

a valve member, and a valve spring, the valve spring securable between the plug and the valve member, wherein the valve spring extends through the central opening of the cap and movably secures the valve member against a surface of the cavity in a closed configuration, and the valve spring compresses to move the valve member away from the surface of the cavity in an open configuration.

* * * * *